United States Patent [19]
Doshi et al.

[11] Patent Number: 5,793,654
[45] Date of Patent: Aug. 11, 1998

[54] SATURATING ALIGNMENT SHIFTER

[75] Inventors: Gautam B. Doshi; Sivakumar Makineni, both of Sunnyvale, Calif.

[73] Assignee: Intel Corporation, Santa Clara, Calif.

[21] Appl. No.: 719,835

[22] Filed: Sep. 30, 1996

[51] Int. Cl.⁶ .................................. G06F 7/00; G06F 7/42
[52] U.S. Cl. ........................ 364/715.08; 364/748.11
[58] Field of Search ........................... 364/715.08, 748.11, 364/736.02, 748.07

[56] References Cited

U.S. PATENT DOCUMENTS

| | | | |
|---|---|---|---|
| 5,020,013 | 5/1991 | Maher, III et al. | 364/715.08 |
| 5,099,445 | 3/1992 | Studor et al. | 364/715.08 |
| 5,369,607 | 11/1994 | Okamoto | 364/748 |
| 5,465,222 | 11/1995 | Seckora | 364/715.08 |
| 5,559,730 | 9/1996 | Marui et al. | 364/715.08 |
| 5,636,351 | 6/1997 | Lee | 364/715.08 |

*Primary Examiner*—Tan V. Mai
*Attorney, Agent, or Firm*—Blakely, Sokoloff, Taylor & Zafman

[57] ABSTRACT

A saturating alignment shifter for use in the multiply and accumulate unit in a floating point arithmetic unit of a microprocessor that mimics the ideal model of an infinitely wide shifter. A saturation alignment shifter is provided that, in the case of the operation of A*B±C, saturates at a predetermined shifting increment and, in the case where the mantissa of C is saturated, places the mantissa C in the left most significant bits. After adding C to A*B in a summation unit, the mantissa of A*B ends up in the right most significant bits and a single intervening bit, termed the bubble bit, remains between the mantissa of C and the mantissa of A*B. The bubble bit acts to mimic any intervening bits that would have occurred in the case of an ideal infinitely wide shifter. The new shifter eliminates hardware required for special cases and treats all operations with a single alignment shifter giving a system that is faster and more simple than conventional systems.

21 Claims, 10 Drawing Sheets

SATURATING ALIGNMENT SHIFTER

BACKGROUND OF THE INVENTION

1. Field of the Invention

The present invention refers generally to data processing systems and, more particularly, to apparati for performing floating point arithmetic.

2. Description of Related Art

In floating point arithmetic, numbers are distinguished by their mantissa (M), exponent (E), and sign (S). For example, the number 1234.56 would be specified by $1.23456 \times 10^3$, where M=1.23456, E=3 and S=0. Addition and subtraction to be performed in floating point arithmetic require that numbers be aligned, i.e., the exponents of the numbers be made equal, before addition or subtraction of the mantissas can be performed. For example, consider the following addition operation where A=1234.56 and B=0.789. For the first number A, M=1.23456 and E=3. Similarly, for number B, M=7.89 and E=−1. Addition of these two numbers requires alignment of the mantissas by the amount of the difference of the exponents. Thus, for the above example, shifting of B to the right is required by 3−(−1)=4 positions giving:

$$1.234560 \times 10^3$$
$$0.000789 \times 10^3 \text{ (7.89 right shifted by 4 digits)}$$
$$\overline{1.235349 \times 10^3 = 1235.349}$$

In conventional arithmetic systems, such as a floating point unit of a microprocessor, the mantissa of the number with the smaller exponent is shifted to the right by an amount equal to the difference in their exponents. This enables using a unidirectional shifter that is easier and less complicated than a bidirectional shifter. In some cases, in which one of the mantissas is not readily available by reason of the arithmetic operations, the available mantissa is always shifted to align with the unavailable mantissa using the exponents to determine the proper shifting distance. This requires a shifter that is capable of shifting in both directions depending on which of the two exponents is greater.

Consider, for example, computing the equation A*B+C in the floating point unit of a microprocessor where the numbers A, B and C have exponents $E_A$, $E_B$, and $E_C$ respectively. Mantissas $M_A$, $M_B$ and $M_C$ respectively and the product of A*B has exponent $E_{A*B}$ and mantissa $M_{A*B}$. When adding the product A*B to C, there is a delay where $M_{A*B}$ is being computed in the multiplication unit located in the floating point arithmetic unit. The numbers $M_A$ and $M_B$ are delivered to a multiplication unit in the floating point unit where they are multiplied producing a sum vector and a carry vector, the sum of these two vectors giving $M_{A*B}$.

The multiplication of the mantissas is greatly time consuming, whereas addition of the exponents is not. If $E_C$ is greater than $E_{A*B}$, $M_{A*B}$ may need to be shifted, which may not be available. Hence, $M_C$ is the mantissa to be shifted right or left.

In the example above, if $E_C$ is smaller than $E_{A*B}$, $M_C$ is shifted to the right. Conversely, in the event that $E_C$ is greater than $E_{A*B}$, $M_C$ will be shifted to the left. If $E_C$ is larger than that of $E_{A*B}$+65 (Assuming 64-bit mantissa) a special case arises. Since $M_C$ would be shifted to the left, $M_C$ will participate in determining the most significant bits of the resultant number with a possible 1-bit correction at the least significant bit.

Throughout the specification, reference will be made to a 64-bit mantissa. The size of the mantissa, for purposes of the invention, is arbitrary. The 64-bit size is a common size in the industry and is only used for illustrative purposes. The general concepts of binary mathematics described in this background, as well as the function of the invention set forth later in the detailed description, can be adapted to any size mantissa and, therefore, are not limited to a 64-bit mantissa.

In the case where $E_C$ is much larger than $E_{A*B}$, that is, when $E_C$ is greater than $E_{A*B}$+65 after $M_C$ is shifted and ultimately added to $M_{A*B}$, if we had a theoretical infinite width shifter, the most significant 64 bits will be the same number as $M_C$, and the least significant 128 bits will be $M_{A*B}$. As a result, there will be intervening bits between the two mantissas of 0's or 1's. In this case, $M_C$, after alignment, will get lost to the left because the shifters used in conventional systems are not of infinite width and thus lose some bits of $M_C$. This results in an error. This error is resolved later on in the system in the critical path by eventually choosing $M_C$ as a resultant number and multiplexing it into the result.

If $E_{A*B} > E_C$, then $M_C$ will be right-shifted. If $E_{A*B} > E_C +63$, then some bits of $M_C$ will fall to the right of LSB of $M_{A*B}$ and will be used to generate round and sticky bits.

Conventional systems typically treat the case of large exponential differences as special cases by employing special hardware to handle the large difference in the exponents when, as in our example, $E_C$ is greater than $E_{A*E}$+65, causing $M_C$ to shift left past $M_{A*B}$ such that the least significant bit of $M_C$ is beyond the most significant bit of $M_{A*B}$. The special hardware is used to deliver $M_C$ as the result mantissa in a case where $E_{A*B}$ is substantially smaller than $E_C$ while computing the round and sticky bits from $M_{A*B}$.

Now referring to FIG. 1, a datapath in a conventional multiply and accumulate unit is shown. A multiplication unit 10 receives mantissa A ($M_A$) and mantissa B ($M_B$), each being 64 bits and produces a sum 12 and a carry 14 which, when added, gives $M_{A*B}$. An alignment shifter 16 receives $M_C$ and performs the alignment function to align $M_C$ with the product of $M_{A*B}$. From here, the sum of $M_{A*B}$ and the carry of $M_{A*B}$ are added to $M_C$ after alignment in the summation unit 18. The sum is then sent to the normalization shifter 20 for normalization and then to the multiplexer circuit 22. In the multiplexer circuit 22, as is typical in conventional systems, a choice is made by the floating point unit whether to send the result of the normalization shifter to the rounding unit 24 before further computation, or to simply send $M_C$ as the final result.

This choice to send $M_C$ would occur in a special exception where $E_C$ is greater than $E_{A*B}$ by more than 65. The exponent generator 26 computes the exponent of the result, as in the example A*B±C, using $E_A$, $E_B$ and $E_C$ individually. The alignment shifter 16 receives data from the exponent generator 26 to determine how far to shift $M_C$ and in which direction. Since the output of the rounding unit is only 64 bits, $M_C$ would naturally be the result when $E_C > E_{A*B}$+64 and would simply be passed on as the result, with $M_{A*B}$ being used to compute round, and sticky bits. In some corner cases, the multiplexer may have to choose $M_C-1$ as a result of a corner case. This multiplexer circuit configuration, being located in the critical path of the data, slows down computation of the ultimate results.

The special hardware used to account for $M_C$ as the final result is slow and is located in the critical path of the operations in the floating point arithmetic unit. Of course, it would be impractical for a system to incorporate an exceptionally wide shifter in order to account for these special cases. However, it would be useful to provide an apparatus that can closely simulate an infinitely wide shifter at low cost. As will be seen, the present invention solves the problems of the prior art in a simple, elegant manner for the special case where $E_C$ is much greater than $E_{A*B}$, as well as all other cases.

SUMMARY OF THE INVENTION

One embodiment of the present invention provides a saturating alignment shifter that is effectively of infinite length in operation. The saturating alignment shifter can be implemented in a multiply accumulate unit in a floating point arithmetic unit, which can be incorporated in a microprocessor or any other device that may require addition or subtraction of binary numbers.

The saturating alignment shifter could also be effectively implemented in any device that requires alignment of numbers prior to addition or subtraction. In one embodiment of present invention, the saturating alignment shifter is configured to properly align a mantissa of a first number having a first exponent with respect to the mantissa of a second number having a second exponent so that the two numbers can be added, subtracted or otherwise manipulated. In the event that the first exponent exceeds the second exponent by a predetermined limit, the embodiment is further configured to align the first mantissa such that the first mantissa is located in a leftmost position with respect to the location of the most significant bit of the second mantissa, resulting in the first mantissa being separated from the second mantissa by at least one bit, termed the bubble bit, when the two numbers are added in a summation vector. This bubble bit that intervenes between the first mantissa and the second mantissa simulates any quantity of intervening bits that may occur between two mantissas in a result when two numbers having large exponential differences are added. Thus, the invention provides for proper alignment of binary numbers for addition or subtraction regardless of the size of their respective exponents.

Accordingly, a saturating binary logic shifter for simulating a shifter of infinite width is provided that is faster, less complex, and requires less hardware than systems that are presently available, and actually eliminates a step from the critical path of conventional multiply and accumulate units of floating point units used in microprocessors.

DETAILED DESCRIPTION OF THE PREFERRED EMBODIMENT

Figure 1:
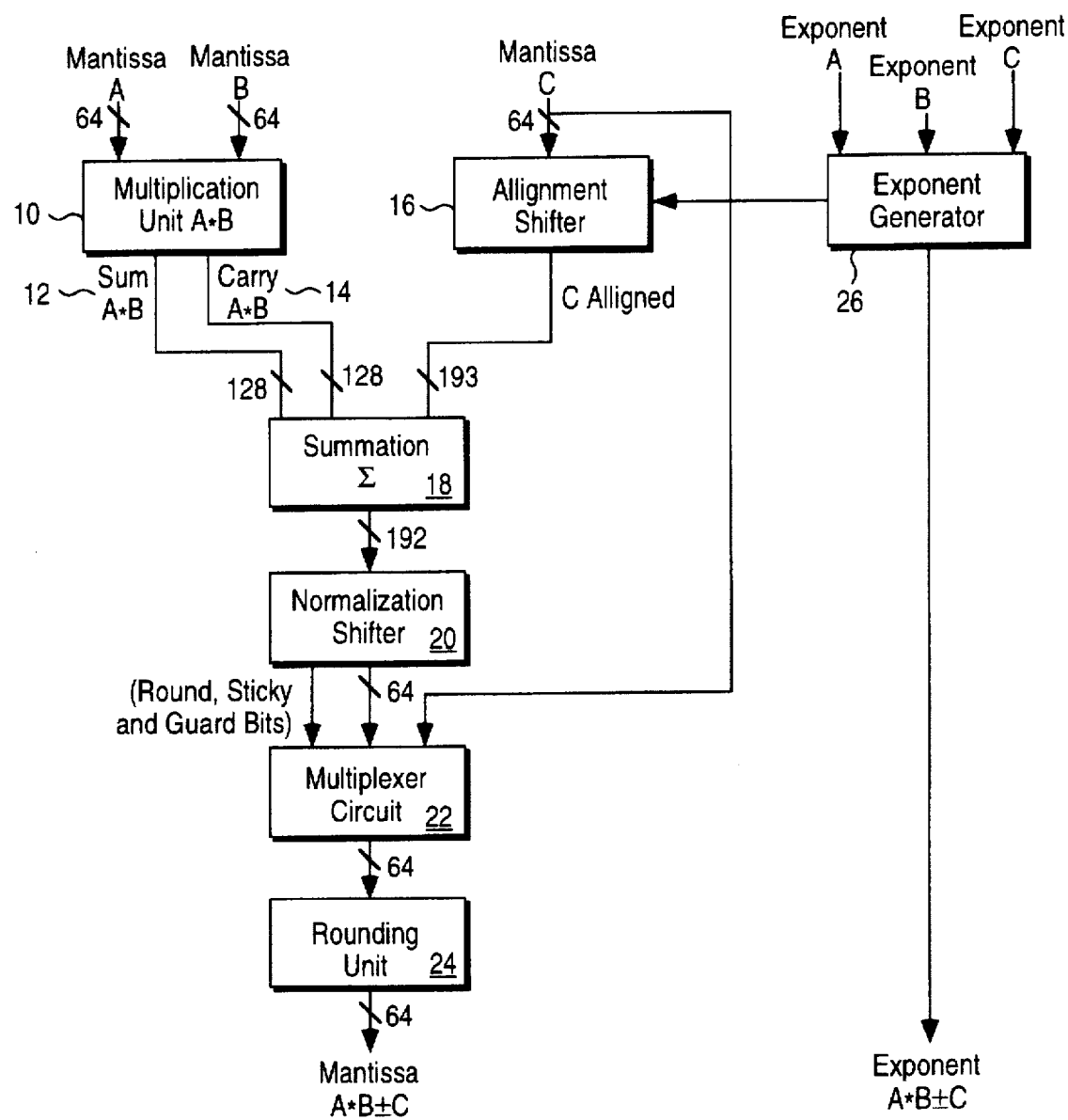
FIG. 1 is a general block diagram of the datapath of a conventional multiply and accumulate circuit in the floating point arithmetic unit of a microprocessor.

The present invention provides for an alternative to presently practice methods of electrical arithmetic operations by providing a saturating alignment shifter that mimics a shifter of infinite width. Unlike the currently implemented arithmetic hardware, the present invention performs arithmetic computations regardless of the size of the difference between exponents of different numbers. Furthermore, one embodiment of the saturating alignment shifter reduces the total hardware required for performing floating point arithmetic when implemented in a floating point unit. Since the hardware required for handling special cases in prior art implementations of a floating point unit often multiplexes the final result into the mainstream hardware, elimination of this multiplexing step provides floating point units that include the new shifter much faster than current systems presently practiced.

FIGS. 2 through 7 of the drawings disclose various embodiments of the present invention for purposes of illustration. One skilled in the art will recognize alternative embodiments that may be employed without departing from the principles of the invention that are illustrated by the structures and methods described herein. One example is a multi-level shifter described below that can be employed in a floating point unit or any other arithmetic device that requires efficient alignment of numbers in order to perform efficient mathematic computations.

For purposes of clearly describing one embodiment of the present invention as well as the prior art, the operation of A*B+C, where A, B and C are binary numbers with mantissas of 64 bits each and finite exponents, will be used to describe the function of the operation units used throughout the datapath in the floating point arithmetic unit to perform the mathematic operations. Other combinations of functions and mantissa widths can be performed by the same embodiment; however, this 64-bit case is chosen to illustrate the deficiencies of the prior art and ways in which the present invention overcomes them.

In one embodiment of the present invention, a saturating alignment shifter is configured to properly align a mantissa of a first number having a first exponent with respect to the mantissa of a second number having a second exponent. The alignment is done such that the two numbers can be aligned properly so that they can be added. In the event that the first exponent exceeds the second exponent by a predetermined limit in a first vector, the saturating alignment shifter in one embodiment is configured to saturate the amount that the first mantissa is being shifted. The shifter then aligns the first mantissa such that the first mantissa is located in a left-most position with respect to the location of the most significant bit of the second mantissa and separated from the second mantissa by at least one bit, termed the "bubble bit," when the two numbers are added in a summation unit. The function of the bubble bit is described below and, generally, is used to imitate intervening bits that would occur between the two mantissas in the event where, after adding the two numbers in a summation unit, the result is a number having the first mantissa in the left-most position, the second mantissa occurring to the right of the least significant bit of the first mantissa and a number of intervening bits between the two mantissas. This is discussed below in further detail in connection with actual examples shown in FIGS. 7 and 8.

Figure 2A:
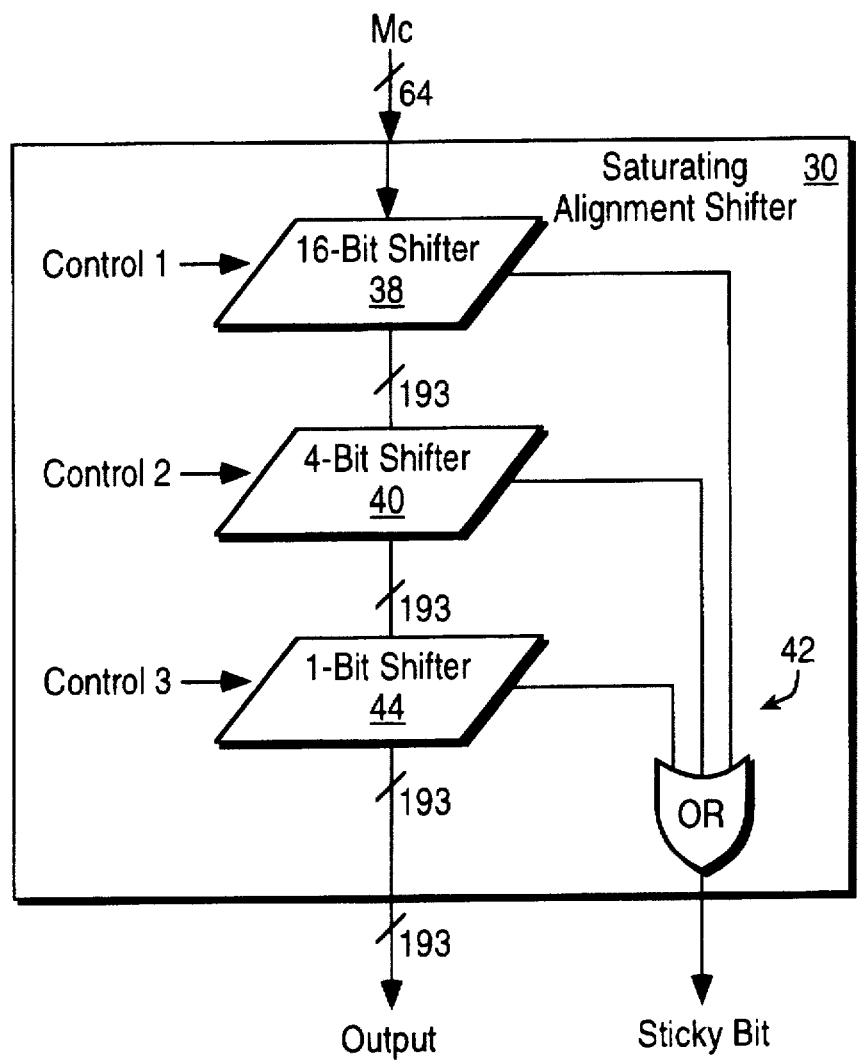
FIG. 2A is a general block diagram of the alignment shifter in accordance with one embodiment of the present invention.

Referring to FIG. 2A, further details of the internal alignment mechanism of the saturating alignment shifter are shown. The saturating alignment shifter 30 is a multi-level shifter having shifters 38, 40 and 44 of different sizes at each stage, independent control at each stage and an OR circuit 42 that logically ORs together sticky bits from each stage.

The particular embodiment shown in FIG. 2A is a three-stage shifter. Any number of stages and any size shifter can be implemented without departing from the spirit and scope of the invention along with shifters of various shifting increments. This particular embodiment, a preferred embodiment, employs a 16-bit shifter 38 that right-shifts the input number in multiples of 16 (0, 16, 32, 48 . . . 192), a 4-bit shifter 40 shifting in multiples of 4 (0, 4, 8 and 12) and a 1-bit shifter 44 shifting in increments of 1 (0, 1, 2, and 3).

The first stage receives $M_C$ having 64 bits and right-shifts the number in 16-bit intervals with 16-bit shifter 38 in response to Control 1. A sticky bit is also output to the OR circuit 42 for participation in the sticky bit computation. The output of the 16-bit shifter 38 is a 193-bit vector containing the partially shifted mantissa after the first shifting stage. The second stage of the saturating alignment shifter 30 includes a 4-bit shifter 40 that right-shifts the 193-bit vector in intervals of 4 bits in response to Control 2 and outputs a sticky bit into the sticky bit circuit 42. The output of the second shifter 40 is another 193-bit number having the $M_C$ in its new shifting position. The third stage includes a single bit shifter 44 that receives the 193-bit Vector from the second stage and right-shifts the number in one bit intervals in response to Control 3 and outputs a sticky bit into the ORing circuit 42. The output of the third shifter is a final 193-bit number that is properly aligned for addition. In the event that the first mantissa $M_C$ is larger than the second mantissa by a predetermined amount, the shifter simply does not shift $M_C$ and delivers $M_C$ to a summation unit in a leftmost position.

Figure 2B:
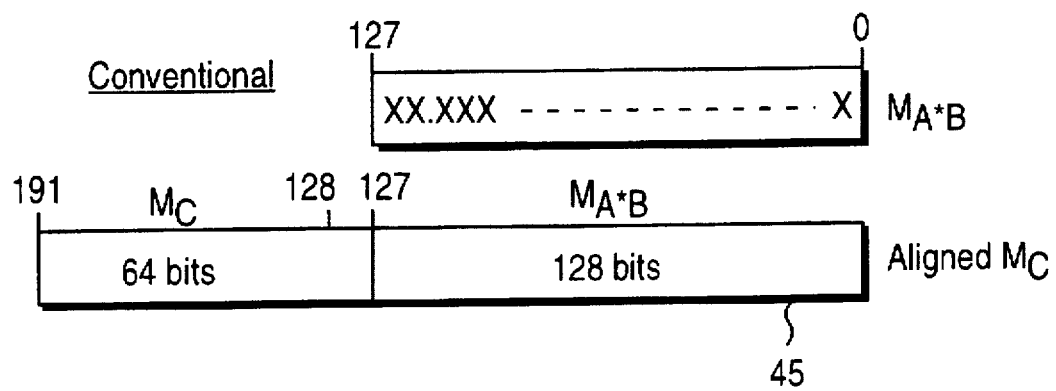
FIGS. 2B and 2C are block representations comparing a shifter embodying prior art methods to a shifter in accordance with the present invention.
Figure 2C:
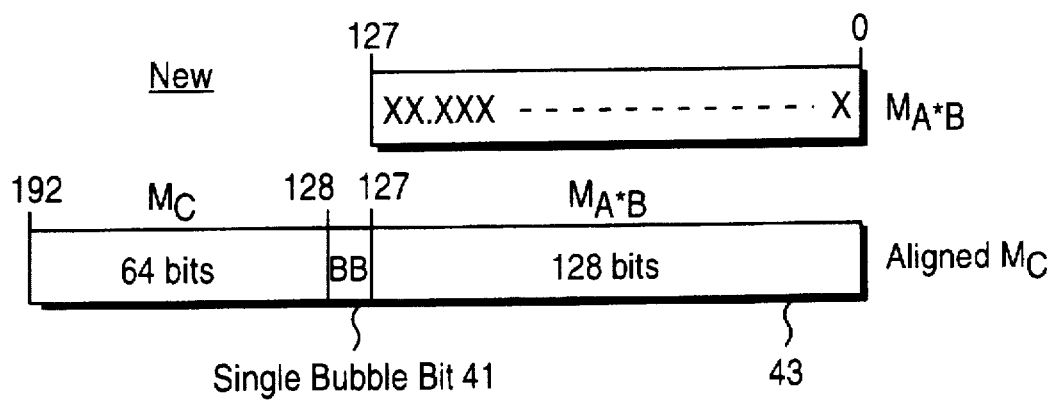

Referring now to FIGS. 2B and 2C, a comparison of a prior art alignment shifter with a shifter embodying the present invention is shown. The primary difference between the prior art shifter 45 in FIG. 2B and the new shifter 43 in FIG. 2C is the presence of the bubble bit 41 that is located between $M_C$ and $M_{A*B}$ shown in vector 43. This gives a total of 193 bits in the new shifter as opposed to 192 bits in a shifter embodying conventional methods, such as shifter 45. The bubble bit 41 located at bit 128 guards any unnecessary carries that may propagate from $M_{A*B}$ to $M_C$. These vectors 43, 45 represent the resultant vectors from the equation A*B±C. Further details on how this vector functions and how the presence of the bubble bit greatly improves addition and subtraction of binary numbers is discussed in further detail below.

Figure 3A:
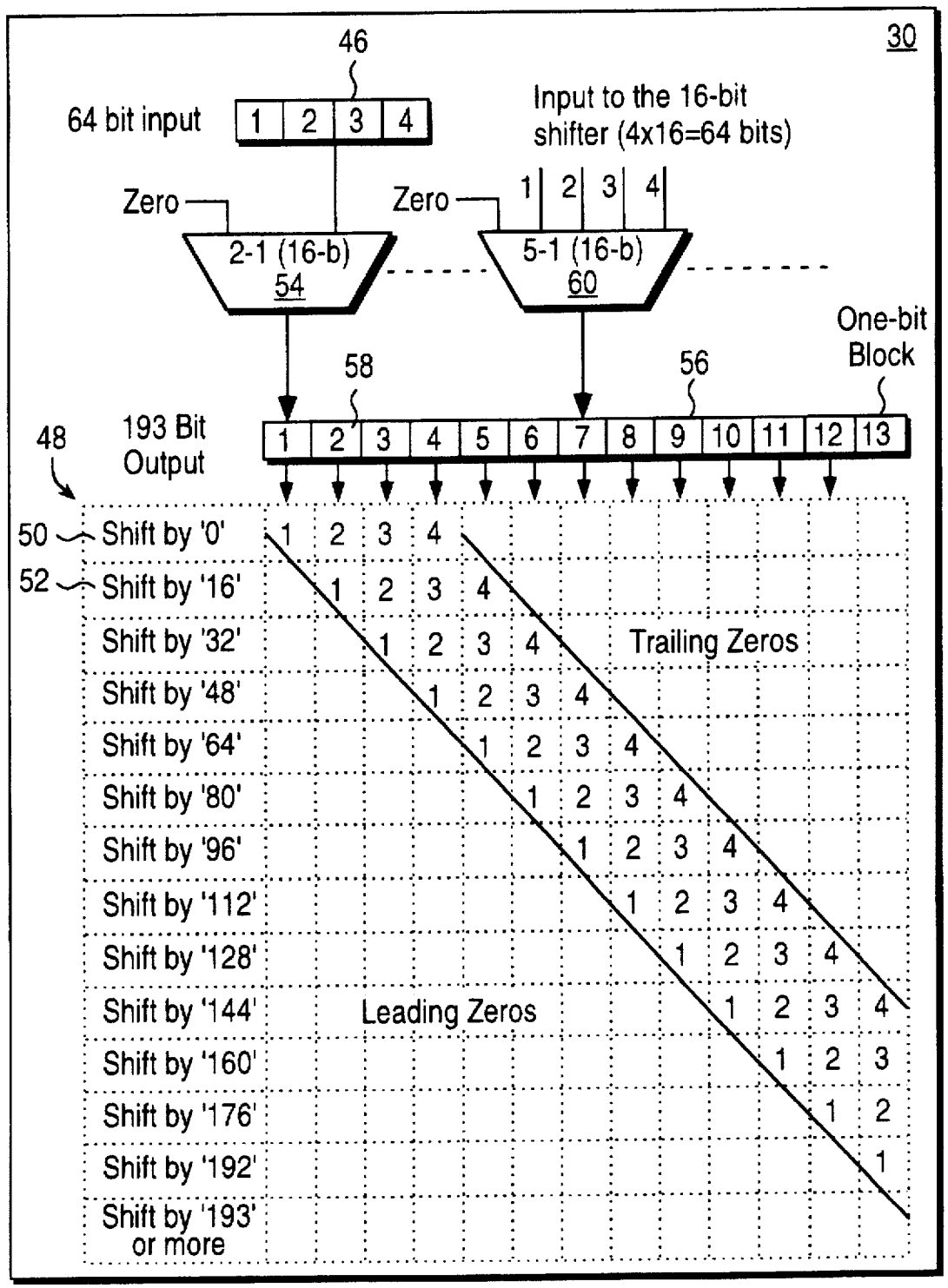
FIGS. 3A–3C are general block diagrams of the internal features of the alignment shifter in accordance with one embodiment of the invention.

Referring now to FIG. 3A, a more detailed implementation of the 16-bit shifter 30 of FIG. 2A is shown. As shown in FIG. 3A, the 64-bit input number 46 is divided into four blocks of 16 bits from the most significant block 1 through the least significant block 4. The output of the 16-bit shifter 38 is a 193-bit number, including the bubble bit, which is shown as twelve 16-bit blocks. The matrix 48 illustrates the mapping between the 64 bit input number and the 193-bit output number for various shift amounts.

Figure 3B:
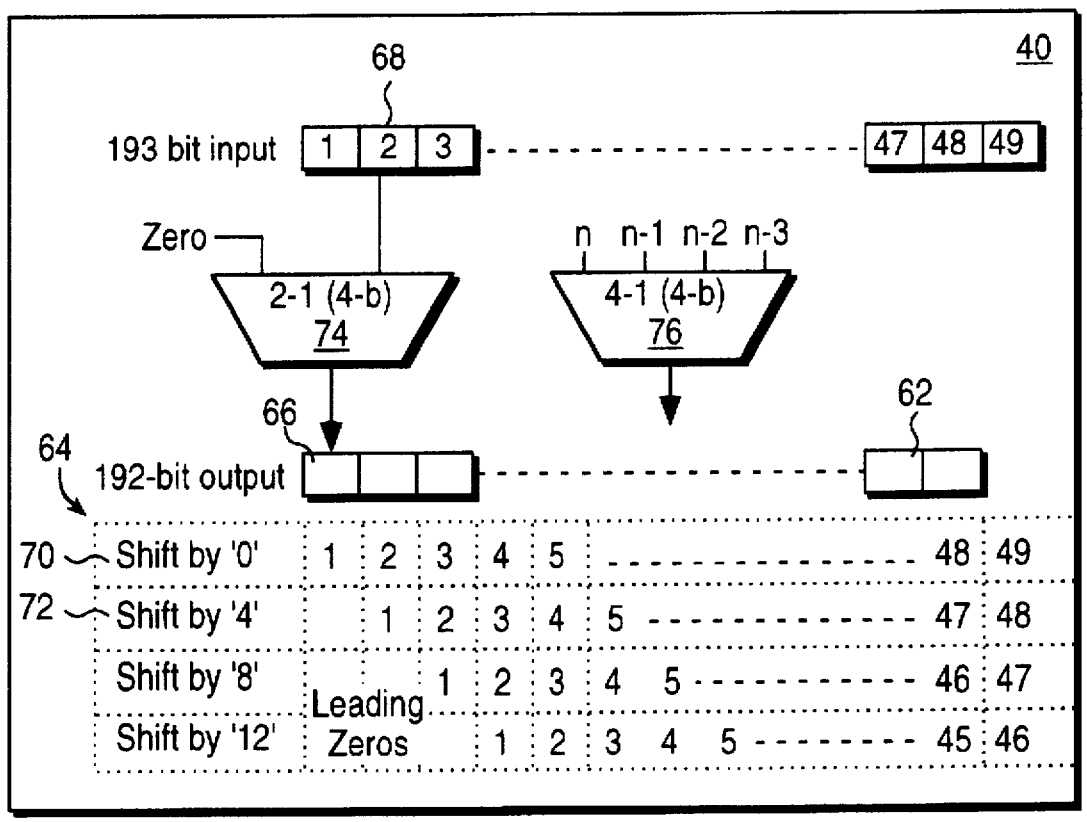
Figure 3C:
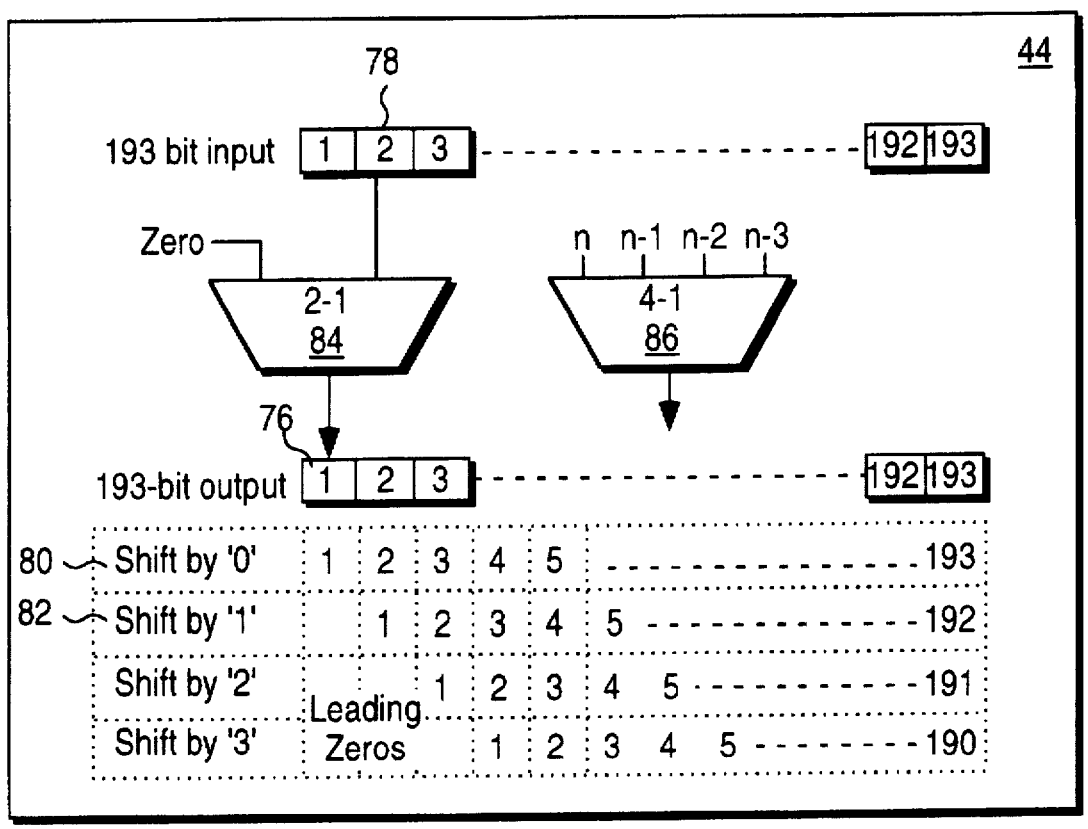

In one embodiment, the shifter is a unidirectional shifter. The shift amount shown in the left columns of FIG. 3A, as well as FIGS. 3B and 3C, are not the exponential differences of the two numbers. The shift amounts are the exponential difference plus 66. The matrixes illustrating the shift amounts presume that the $M_C$ is prealigned in the leftmost position with its least significant bit occurring to the left of the bubble bit.

Figure 4:
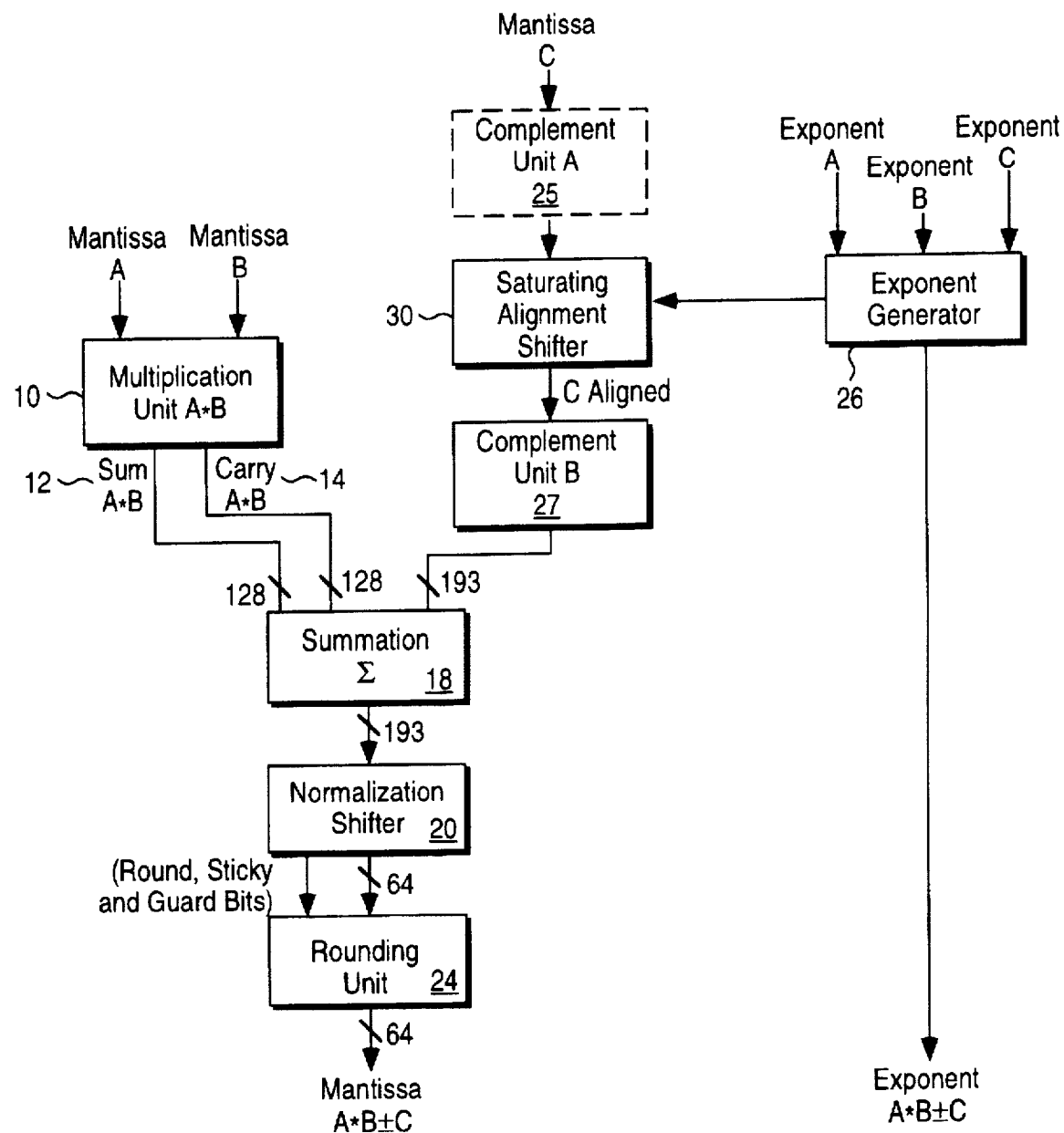
FIG. 4 is a general block diagram illustrating the datapath of an addition circuit within the multiply and accumulate circuit including the saturating alignment shifter of the present invention in the multiply and accumulate unit of a microprocessor.

For example, if the shift amount is zero, the output MSB 16-bit block should receive the input MSB 16-bit block. This is shown in the first row of the matrix 50. The second row 52 shows that the mapping if the shift amount is sixteen. Similarly, the subsequent rows show the mappings for various shift amounts. So in the first column of the matrix, the MSB 16-bits of the output can get either the first 16-bit block of the input when the shift amount is zero or a series of zeroes for all the other shift amounts. Here, it is assumed that for the subtraction operation $M_C$ is complemented after the alignment of $M_C$. As can be seen in FIG. 4 discussed below, the complement unit A 25 can be placed early in the critical path of $M_C$ prior to the alignment shifter 30. In our example, however, we assume that the complement unit B27, shown in FIG. 4, is utilized, which complements $M_C$, if needed, later in the critical path of $M_C$ after being aligned in the alignment shifter 30. The 16-bit shifter includes a series of thirteen multiplexers each communicating with a block in the shifting vector 56.

Each of these multiplexers selects the proper information to be inserted into the matrix sector 56. For example, the first multiplexer, a 2-1 multiplexer, chooses whether the first 16 block of the input gets placed in the first block of the shifting vector 56 when the shift amount is zero or to place zeros in the first block for all other shift amounts. Similarly, the second block 58 require a 3-1 multiplexer in order to choose between zero, the first block of data or the second block of data from the input. In the most extreme case, the 5-1 multiplexer 60 is needed to choose between the first block of data, the second block of data, the third block of data, the fourth block of data and zero. In the position related to the multiplexer 60 shown in FIG. 3a, the 5-1 multiplexer that chooses the first 16-bit block of the input if the shift amount is 96, the second 16-bit block if the shift amount is 80, the third 16-bit block of input if the shift amount is 64, the fourth 16-bit block of input if the shift amount is 48 or zero in all other cases. Note that a 5-1 multiplexer is required for positions 4 through 12 of the shifting vector 56. The thirteenth block is a single-bit block which represents the bubble bit.

Now referring to FIG. 3b, the 4-bit shifter 40 of FIG. 2A is shown. The 4-bit shifter stage can shift by 0, 4, 8 or 12 bits. The 4-bit shifter 40 receives the 193-bit number from the 16-bit shifter stage and divides the number into forty-eight 4-bit blocks and one 1-bit block on the right end of the shifter. Each block, located in the 4-bit shifting vector 62 are, like the 16-bit shifter 38, connected to a series of multiplexers each connected to a particular block.

The matrix 64 illustrates the mapping between the input and the output for various shift amounts. For example, if the shift amount is zero, the output of the first block 66, the most significant block, will receive the most significant 4-bit block 68 from the input. This is shown in the first row of the matrix 70. The second row 72 shows the mapping if the shift amount is 4 bits. Similarly, the subsequent rows show the mapping for various 4-bit shifting amounts. Similar to the 16-bit shifter, the 4-bit shifter includes a 2-1 multiplexer 74 communicating with the first block 66 that chooses between the first 4-bit block of the input 68 and zero or all other shift amounts. The most extreme case, the 4-1 multiplexer 76 generating an nth output block is required for positions in the matrix where there are four possible inputs. These locations can get either the nth 4-bit block of the input when a shift amount is zero, the (n–1)th block when the shift amount is 4, the (n–2)nd block when the shift amount is 8 or the (n–3)rd block when the shift amount is 12.

Referring now to FIG. 3C, the details of the 1-bit shifter 44 of FIG. 2A are illustrated. The 1-bit shifter stage can shift by either 0, 1, 2, or 3 bits. The input to the stage is a 193-bit number that was output from the 4-bit shifter stage 40. The shifting vector 76 is numbered from 1 through 193 from the most significant bit to the least significant bit corresponding to the most significant bit and least significant bit the input number 78 respectively. The matrix illustrates the mapping between the input and the output for various shifting amounts of the 1-bit shifter. For example, if the shifting amount is zero, the output most significant bit should get the input most significant bit, similarly to the 4-bit and 16-bit shifters. This is shown in the first row 80 of the matrix. The second row 82 illustrates the mapping if the shift amount is 1-bit. Similarly, the subsequent rows show the mapping for various other shift amounts. In a first column, a 2-1 multiplexer 84 could choose between, the most significant bit of the input when the shift amount is zero, or zero for all the shift amounts. For columns having the four possibilities, a 4-1 multiplexer 86 generating the nth output bit is required to choose either the bit of the input if the shift amount is zero. The (n–1)th bit if the shift amount is 1, the (n–2)nd bit if the shift amount is 2 or the (n–3)rd bit if the shift amount is 4.

In the special case where the $E_C$ is greater than the $E_{A*B}$ by more than 65, the bubble bit plays a crucial role. The primary purpose of the bubble bit is to simulate intermediate bits that would exist between the $M_C$ and $M_{A*B}$ after adding A*B to C in the ideal case of an infinitely wide shifter. This includes the special case where $E_C > E_{A*B} + 65$ and the operation is either A*B+C or A*B–C. In either case, the bubble bit simulates the theoretical intermediate bits. This saturating alignment shifter, when aligning the mantissa of one number with that of another, saturates the shift count so that no numbers are lost. This was the case in the prior art designs where, in the operation A*B+C, with $E_C$ being much greater than $E_{A*B}$, $M_C$ was lost and then recovered further down the datapath. In this new embodiment, $M_C$ is saved by saturating the shift count of the alignment shifter such that $M_C$ falls in the left-most bits of the output of the shifter.

The bubble bit will control whether or not a carry from a smaller number will propagate through a larger number in this special case. In particular, the special case is the situation where $E_C > E_{A*B} + 65$. In this case, the smaller number would be $M_{A*B}$ and the larger number would be $M_C$. The result of the addition or subtraction of the two numbers would be $M_C$ located in the leftmost 64 bits, $M_{A*B}$ located in the rightmost 128 bits and the bubble bit located between the two. In the summation unit 18, in the event of an addition, the bubble bit will naturally remain at 0 because the number is not complimented. Thus, in the event that the smaller number involves a carry bit, it will not propagate through the larger number, upsetting the result.

On the other hand, if C is subtracted from A*B, the bubble bit will be automatically set at 1 when C is complemented. This mimics an infinite shifter exactly. Instead of having the large number of ones between the two numbers, there is an intervening bubble bit that mimics all of the ones, allowing carry bits to propagate to $M_C$. Thus, proper computation can be performed accordingly.

Unlike the prior art shown in FIG. 1, one embodiment of the present invention shown in FIG. 4 allows for completely eliminating the multiplexer step 22 by aligning $M_C$ correctly in the saturation alignment shifter 30 in the first step. Like the conventional prior art floating point unit, multiplication unit 10 generates the sum 12 and the carry 14 of A*B. Unlike the conventional prior art embodiment shown in FIG. 1, one embodiment of the saturating alignment shifter 30 aligns $M_C$ regardless of the size of the difference between $E_{A*B}$ and $E_C$, which are generated in exponent generator 26. The properly aligned $M_C$ is then delivered to the summation unit 18 where it is added to the sum 12 and the carry 14 of A*B. The result is delivered to the normalization shifter 20 for normalization.

It is important to note that the embodiment described in FIG. 4 assumes that the compliment step which is used in the event of a subtraction of two numbers occurs after the alignment step. This embodiment would utilize the compliment unit B 27 of FIG. 4. One skilled in the art, if preferred, could design a floating point unit with compliment unit A 25 shown in FIG. 4 occurring prior to the saturating alignment shifter 30. This would require minor changes in the hardware of the saturating alignment shifter 30. Either implementation, however, would clearly be within the spirit and scope of the present invention as described and claimed herein.

In conventional floating point systems, the next step would be the multiplexer circuit 22 shown in FIG. 1. This step is completely eliminated in a floating point unit utilizing the present embodiment of FIG. 4. This eliminates an entire step from the critical path of the number. The final step is the rounding unit 24 giving $M_{A*B±C}$.

Figure 5:
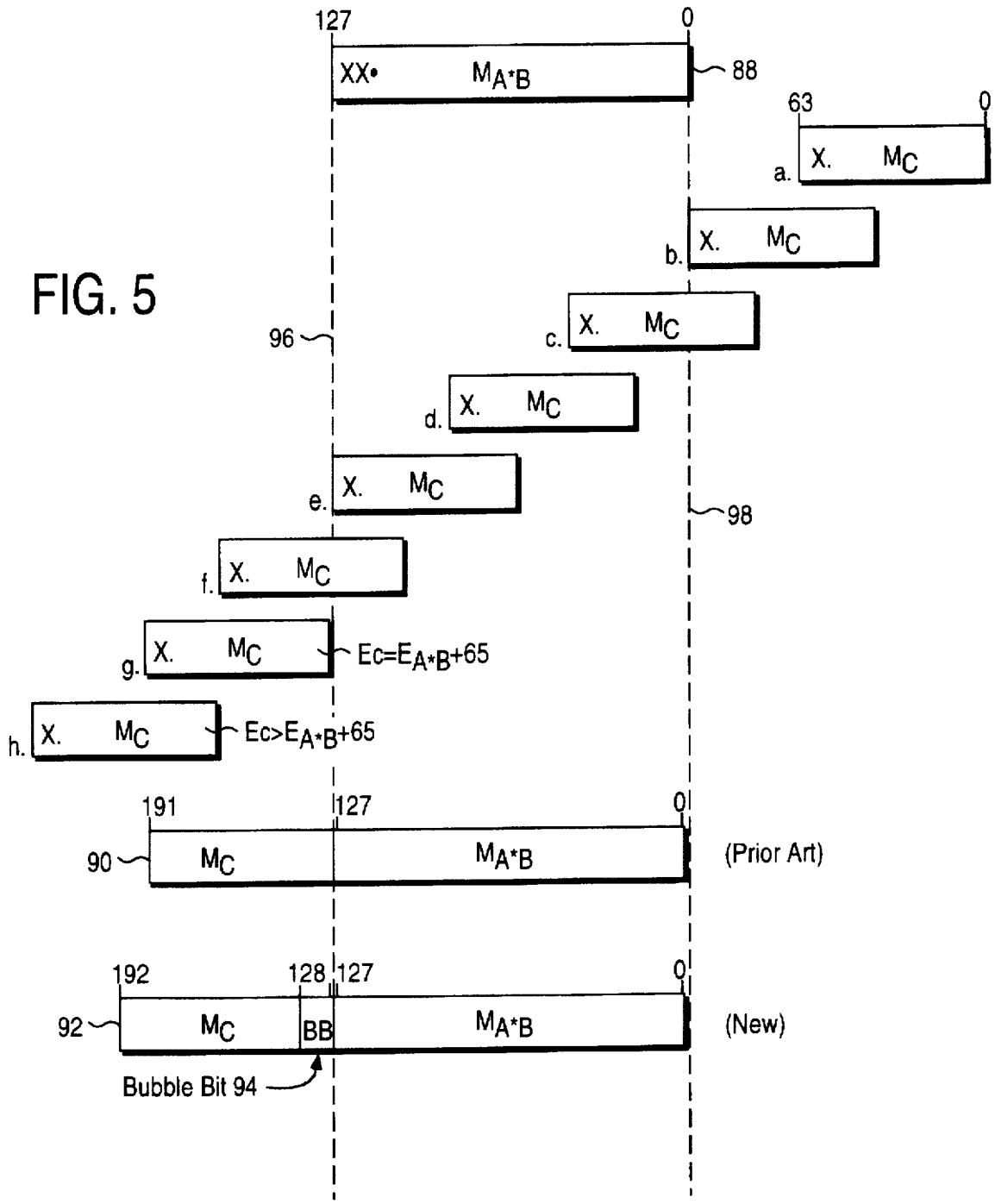
FIG. 5 is a general block diagram of an alignment shifter in accordance with one embodiment of the present invention compared with an alignment shifter of the prior art.

Referring now to FIG. 5 details of the function and purpose of the alignment shifter will be described further. Examples (a)–(h) show $M_C$ in vector form with respect to $M_{A*B}$ (88) after C has been aligned. The resultant vectors after summation of the prior art are illustrated as the prior art vector 90 and the saturating alignment vector 92. The notable difference lies in the addition of a bubble bit 94 in the alignment vector 92.

In the case above, the difference in the exponents is in the range $E_{A*B} - E_C > 126$. Most significant bits of $M_{A*B}$ will be delivered to the final result and $M_C$ will be used in computing the sticky and round bits of the final number. This is true in the prior art shifter 16 of FIG. 1 as well as that of the new saturating alignment shifter 30 of FIG. 2A. In fact, cases (a)–(g) are treated the same in the prior art shifter 16 as well as the new shifter 30. Any part of $M_C$ that ends up to the right of the least significant bit of A*B will be used in the computation of round, sticky and guard bits. Any portion of $M_C$ that ends up between the left range 96 and the right range 98 of A*B will be added to A*B and participate in the final result. Data bits of $M_C$ that appear to the left of the left range will become the left most significant bits of the result. As shown in case (f), one portion of $M_C$ is used as the left most significant bits of the results and another portion of $M_C$ is added to a portion of left most significant bits of A*B. In the case of example (g), $M_C$ actually becomes the result and is passed on to the normalization and rounding units. In this case, $M_{A*B}$ will be used in its entirety in computing the round, sticky and guard bits. In all cases (a)–(h), the prior art, as well as one embodiment of the present invention, operates to deliver $M_{A*B}$ in the summation unit 18, and align $M_C$ in the appropriate location before delivering aligned $M_C$ to the summation unit 18, for addition to A*B. The manner in which $M_C$ participates in the final result depends on where $M_C$ ends up after being aligned.

Figure 6:
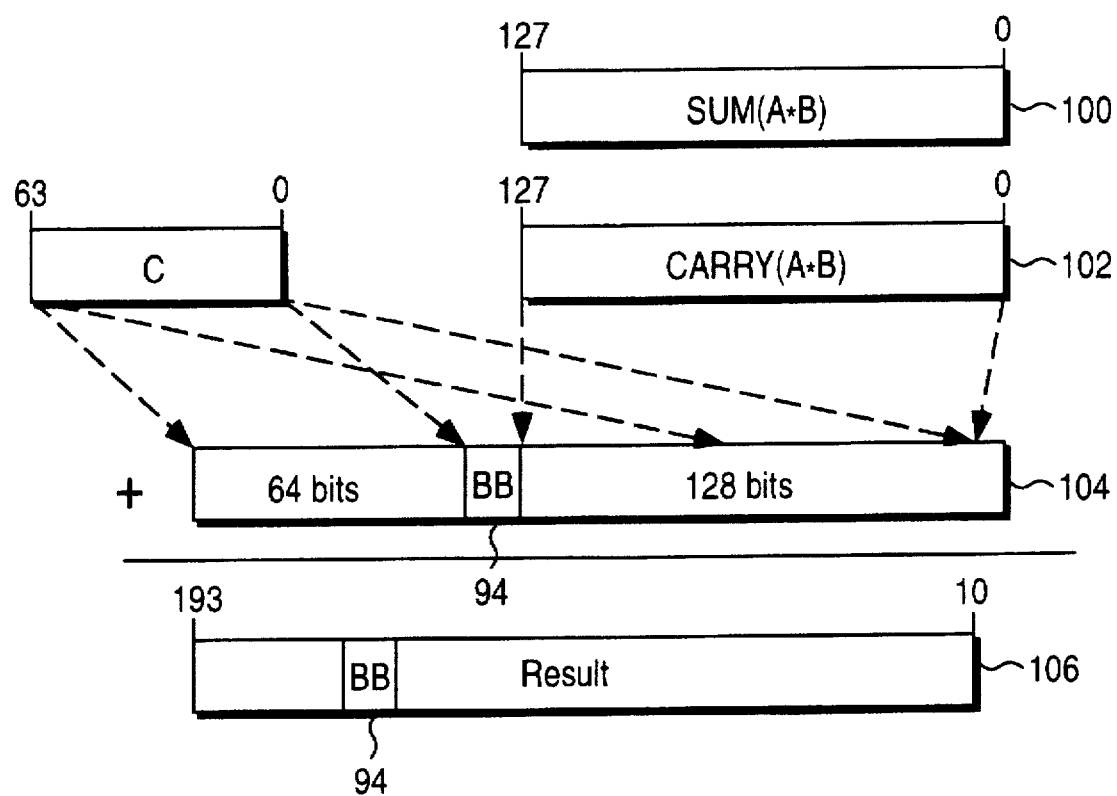
FIG. 6 is a general block diagram of the alignment shifter in accordance with one embodiment of the present invention.

As shown in FIG. 6, A*B is the result of the addition of sum vector 100 and carry vector 102 produced by multiplication unit 10 of FIG. 4. $M_C$ is placed wherever it lines up with the mantissa of A*B after alignment. The sum and carry of A*B are then added to aligned $M_C$ in vector 104 giving the result 106 of A*B+C. As mentioned above, this is true in both the prior art as well as the new shifter in cases (a)–(g). The distinction in the new shifter, however, is in the way it functions to treat the special case of (h) where the exponents compare as $E_C-E_{A*B}>65$.

The alignment shifter 16 of the prior art shown in FIG. 1 did not distinguish between case (h) and the other cases. The floating point unit of the prior art simply went through the same functions and, at the stage of the multiplexer circuit 22, determined whether or not the special case of case (h) existed and simply chose $M_C$ as the resultant mantissa and used $M_{A*B}$ in computing the round and sticky bits. The present invention, on the other hand, handles all cases (a)–(h) with a single saturation alignment shifter 30 shown in FIG. 2A and produces the correct result at the summation circuit 18. This eliminates the entire multiplexing step at the multiplexer circuit 22 of FIG. 1, simplifying and speeding up the entire process at low cost. After addition, this bubble bit 94 of FIG. 3 ends up between $M_C$ and the $M_{A*B}$ in case (h).

Figure 7:
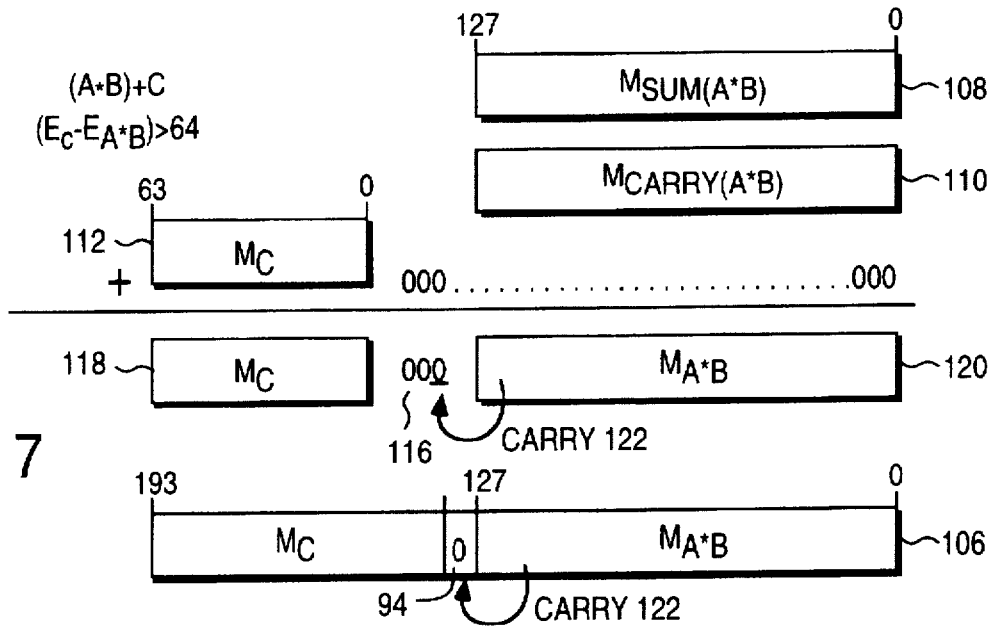
FIG. 7 is a general block diagram of the alignment shifter in accordance with one embodiment of the present invention illustrating an addition example.
Figure 8:
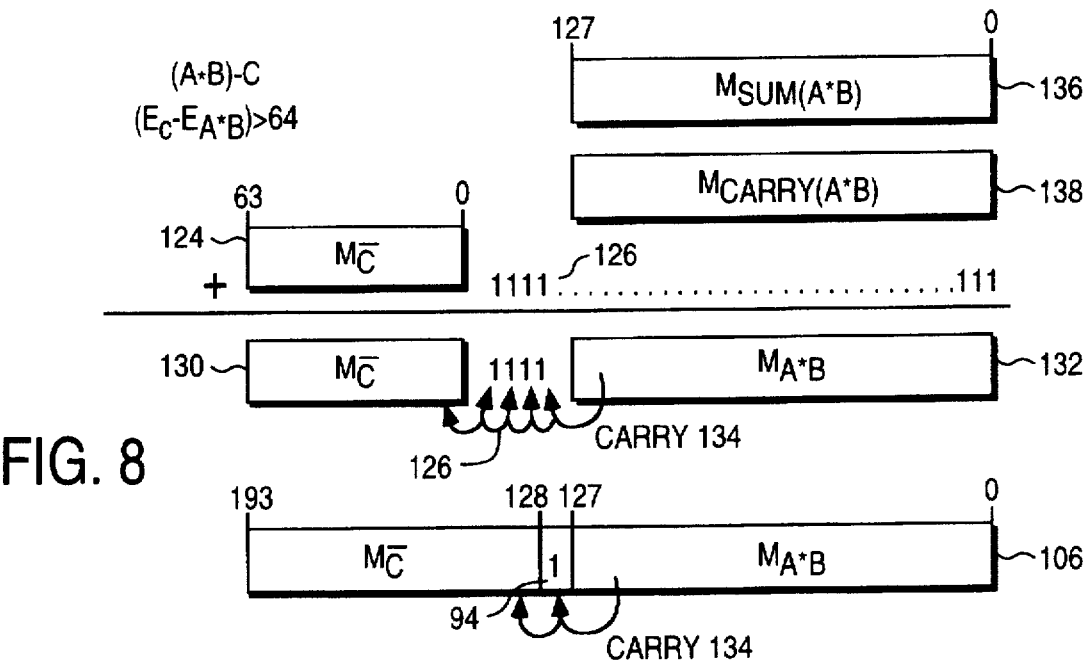
FIG. 8 is a general block diagram of the alignment shifter in accordance with one embodiment of the present invention illustrating a subtraction example.

Now referring to FIGS. 7 and 8, two extreme cases of the function of A*B+C and A*B–C where $E_C-E_{A*B}>65$ are illustrated to show extreme cases where the bubble bit functions exactly as an infinite number of intervening bits would function in an ideal infinitely wide shifter.

Referring first to FIG. 7, the function of A*B+C where $E_C-E_{A*B}>65$, is illustrated. In this case, which is case h of FIG. 5, the sum of A*B 108 and the carry of A*B 110 are added to the aligned $M_C$ 112 to give the final result in the result vector 114. When aligned $M_C$ is simply added to these two vectors in a summation unit, assuming an ideal infinitely wide shifter, a series of zeroes 116 occurs between $M_C$ 118 and $M_{A*B}$ 120. However, in the case of an infinitely wide shifter delivering aligned $M_C$ to an ideal infinitely wide summation unit, this would not affect $M_C$ because the intervening zeroes between $M_C$ and $M_{A*B}$ would absorb the carry and $M_C$ would be passed on as a result unaffected. As can be seen in the output vector 114, in accordance with this embodiment of the present invention, the bubble bit 94 acts in the same manner. In the event that a carry 122 occurs adding the sum of A*B 108 with a carry of A*B 110, the bubble bit 94 will absorb the carry 122 and MC will be transferred on as the summation unit output unaffected.

In the second case of A*B–C illustrated in FIG. 8, where $E_C-E_{A*B}>65$, the new alignment shifter handles this operation equally as efficiently. When C is subtracted from A*B, the complement unit 27 of FIG. 4 simply complements $M_C$ after alignment and delivers complimented aligned C 124 to the summation unit. When complemented, $M_C$ produces a series of logic ones 126 throughout the entire vector to the right of $M_C$. After addition of $M_C$ to $M_{A*B}$, all of the intervening bits between $M_C$ complement and $M_{A*B}$ are ones. In a theoretical infinitely wide shifter, when A*B is added to the complement of C, this addition would naturally propagate a carry throughout the intervening bits 126 up to and including $M_C$ 130. In the embodiment of the alignment shifter in accordance with the present invention, the bubble bit mimics these intervening bits exactly the same. When C is aligned in the saturation alignment shifter, the bubble bit 94 is complemented along with $M_C$. Therefore, when $M_{A*B}$ 132, as a result of addition to C in the summation unit, ends up in the rightmost 128 bits of the output 135 and $M_C$ complement ends up in the leftmost 64 bits, with the bubble bit having a logic 1. This occurs after the addition of vectors 136, 138. In the event that there is a carry 134 from A*B, the carry bit is advanced to the bubble bit 94 when the sum and carry of A*B 136, 138 respectively are added to the aligned and $M_C$ complement 130 which in turn carries to $M_C$ complement and propagates therethrough. This is exactly how a series of intervening bits of all logic 1s would operate.

Referring again to cases (a)–(g) of FIG. 3, the saturation alignment shifter in accordance with the present invention in the embodiment described above operates similarly. The new result vector 106 is 193 bits wide as opposed to the prior art which is typically 192 bits wide. The difference is the bubble bit 94. In the cases of case (a)–(g), $M_{A*B}$, as a result of addition, occurs in the rightmost 128 bits just as they were in the special case of case (h). $M_C$ is added in the summation vector to $M_{Sum}$ A*B and $M_{Carry}$ A*B after being aligned. In special case (h), the saturating alignment shifter performs an operation to place $M_C$ in the leftmost 64 bits of the summation vector.

From the above description, it will be apparent that the invention disclosed herein provides a novel and advantageous saturating alignment shifter for binary floating point arithmetic. As will be understood by those familiar with the art, the invention may be embodied in other specific forms without departing from its spirit or essential characteristics, and thus, the described embodiment is not restrictive of the scope of the invention. The following claims are indicative of the scope of the invention, and all variations which come within the meaning and range of equivalency of the claims are to be embraced within their scope.

What is claimed is:

1. A saturating alignment shifter comprising:
   an input port for receiving inputs;
   a shift control circuit; and
   a shift device coupled to the shift control circuit configured to properly align a mantissa of a first number having a first exponent with respect to the mantissa of a second number having a second exponent before the two numbers are added and in the event that the first exponent exceeds the second exponent by a predetermined limit and being configured to saturate the shifting increment by aligning the first mantissa such that the first mantissa is located in a leftmost position with respect to the location of the most significant bit of the second mantissa and separated from the second mantissa by at least one bit when the two numbers are added.

2. An alignment shifter according to claim 1 further configured to shift the first mantissa by a number of increments according to the difference of the first exponent and the second exponent such that, if the first exponent is greater than the second exponent by a predetermined amount, the alignment mechanism shifts the first mantissa to the right.

3. An alignment shifter according to claim 1 further comprising a multilevel shifter configured to shift the first mantissa in different increments at each stage.

4. An alignment shifter according to claim 1 further comprising an exponent generator configured to indicate zero shift when the first exponent exceeds the second exponent by the predetermined amount, causing the alignment shifter to retain the first mantissa in a leftmost position when transmitted.

5. An alignment shifter according to claim 4 wherein the predetermined amount is the sum of the number of bits in the first mantissa and 1.

6. A saturating alignment shifter according to claim 1 wherein a second vector containing the second mantissa is located in a position such that the most significant bit of the second mantissa is located to the right relative to the leftmost bit of the first mantissa by a length equal to the length of the sum of first mantissa and one bit, wherein the saturation alignment shifter is configured to transmit a first vector containing the first mantissa and a bubble bit to a summation unit and wherein the summation unit is configured to add first number to the second number by adding the first vector to the second vector in the summation unit resulting in the summation vector containing the sum of the first vector and the second vector.

7. A saturating alignment shifter comprising:
    an input port for receiving an input number;
    a shift controller;
    a first shifter coupled to the input port and the shift controller and configured to receive and shift an input number by a first increment and to output a first partially aligned number;
    a second shifter coupled to the first shifter and the shift controller and configured to receive and shift the first partially aligned number by a second increment and to output a second partially aligned number; and
    a third shifter coupled to the second shifter and the shift controller and configured to receive and shift the second partially aligned number by a third increment and to output a final aligned number.

8. An alignment shifter according to claim 7 wherein output from the third shifter is of a length equal to the sum of the number of bits in a first mantissa, the number of bits in a second mantissa and and wherein the alignment shifter is configured such that the number is not shifted, leaving the first mantissa in the leftmost bits of a first vector followed by a single bit when the difference in the exponents is such that the first exponent exceeds the second exponent by a second predetermined amount.

9. An alignment shifter according to claim 8 further comprising a complement unit configured to complement the first vector, the first vector containing the first mantissa and a bubble bit, before the first vector is delivered to a summation unit allowing the first number to be subtracted from the second number in the summation unit by adding the first vector containing a complemental mantissa to a second vector containing the second mantissa.

10. In a floating point arithmetic unit (FPU) of a microprocessor, the FPU including a summation unit having a summation vector and a saturating alignment shifter having a first vector, an alignment mechanism and an exponent generator, the FPU configured to perform an addition or subtraction between a first number having a first mantissa and a first exponent and a second number having a second mantissa and a second exponent where the first number is available before the second number, a method of simulating an infinite width alignment shifter comprising:
    computing the difference between the first exponent and the second exponent with the exponent generator;
    retaining the first mantissa in the leftmost bits of the first vector when the difference exceeds a predetermined amount;
    aligning the first mantissa in reference to the most significant bit of the second mantissa, such that, the first and second mantissa are properly aligned for addition or subtraction when the difference is equal to or less than the predetermined amount.

11. A method according to claim 10 further comprising, after aligning the first mantissa, complementing the output of the alignment shifter when the operation to be performed is subtraction.

12. A method according to claim 11 further comprising, after placing the first mantissa into the leftmost bits of the first vector:
    adding the first mantissa to the second mantissa in a summation vector resulting in the second mantissa being located in a position such that the most significant bit of the summation mantissa is located to the right of the leftmost bit of the second vector by a length equal to the length of the sum of first mantissa and one bit.

13. A floating point arithmetic unit (FPU) comprising:
    a multiplication unit configured to multiply binary numbers;
    a summation unit coupled to the multiplication unit configured to add binary numbers and output a result, wherein a first number having a first mantissa and a first exponent is added to a second number having a second mantissa and a second exponent in the summation unit;
    a saturating alignment shifter coupled to the summation unit having:
    an input port for receiving an input number;
    a shift controller;
    a first shifter coupled to the input port and the shift controller and configured to receive a shift an input number by a first increment and to output a first partially aligned number;
    a second shifter coupled to the first shifter and the shift controller and configured to receive and shift the first partially aligned number by a second increment and to output a second partially aligned number;
    a third shifter coupled to the second shifter and the shift controller and configured to receive and shift the second partially aligned number by a third increment and to output a final aligned number;
    a normalization shifter coupled to the summation unit and configured to normalize a result from the summation unit; and
    a rounding unit coupled to the normalization shifter and configured to round a number to a predetermined precision and rounding mode and output the rounded number.

14. An FPU according to claim 13 wherein the shift controller is configured to shift the first mantissa a number of increments equal to the difference of the first exponent and the second exponent plus a predetermined constant.

15. An FPU according to claim 13 wherein when the difference exceeds a predetermined limit when the first exponent exceeds the second exponent by a predetermined amount no shifting occurs in the alignment shifter.

16. An FPU according to claim 13 wherein the predetermined amount is the sum of the number of bits in the first mantissa and 1.

17. An FPU according to claim 13 wherein the length of the output to the third shifter is equal to the sum of the number of bits in the first mantissa, the number of bits in the second mantissa and 1.

18. An FPU according to claim 13 wherein the output from the third shifter is a 193-bit vector, wherein the first mantissa is 64 bits in exponent exceeds the second exponent by 65, the placement mechanism is configured to retain the first mantissa in the leftmost 64 bits of the first vector.

19. An FPU according to claim 13 further comprising:
a complement unit configured to complement the first vector containing the first mantissa and the bubble bit before the first vector is delivered to the summation unit when the first number is to be subtracted from the second number in the summation unit by adding the first vector as complimented to a second vector containing the second mantissa.

20. An FPU according to claim 13 further comprising:
a complement unit configured to complement the first vector containing the first mantissa and the bubble bit before the first vector is delivered to the saturating alignment shifter when the first number is to be subtracted from the second number in the saturating alignment shifter by adding the first vector as complimented to a second vector containing the second mantissa.

21. In the floating point arithmetic unit (FPU) of a microprocessor, the FPU having a summation unit including a summation vector, wherein a first number having a first mantissa and a first exponent is added to a second number having a second mantissa and a second exponent in the summation unit, the first number being available before the second number, a saturating alignment shifter comprising:

alignment means for aligning the first mantissa with respect to the second mantissa such that the first and the second mantissas are properly aligned for addition;

exponent generation means for indicating whether the first exponent exceeds the second exponent by a predetermined limit; and means for retaining the first mantissa in the leftmost bits of the first vector followed by a bubble bit if the first exponent exceeds the second exponent by the predetermined limit;

wherein the alignment means delivers the first vector to the summation unit for addition of the first number with the second number.

* * * * *

UNITED STATES PATENT AND TRADEMARK OFFICE
CERTIFICATE OF CORRECTION

PATENT NO. : 5,793,654
DATED : August 11, 1998
INVENTOR(S) : Doshi et al.

It is certified that error appears in the above-identified patent and that said Letters Patent is hereby corrected as shown below:

In column 8 at line 29 delete "dearly" and insert --clearly--

Signed and Sealed this

Twenty-ninth Day of December, 1998

Attest:

BRUCE LEHMAN

Attesting Officer

Commissioner of Patents and Trademarks